US 8,971,244 B2

(12) United States Patent
Zhao et al.

(10) Patent No.: US 8,971,244 B2
(45) Date of Patent: Mar. 3, 2015

(54) ACCESS POINT NAME LIST BASED NETWORK ACCESS MANAGEMENT

(75) Inventors: Suli Zhao, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 13/235,295

(22) Filed: Sep. 16, 2011

(65) Prior Publication Data

US 2012/0113865 A1     May 10, 2012

Related U.S. Application Data

(60) Provisional application No. 61/411,712, filed on Nov. 9, 2010.

(51) Int. Cl.
| | | |
|---|---|---|
| *H04W 4/00* | (2009.01) | |
| *H04W 48/20* | (2009.01) | |
| *H04W 8/18* | (2009.01) | |
| *H04W 8/20* | (2009.01) | |

(52) U.S. Cl.
CPC .............. *H04W 48/20* (2013.01); *H04W 8/183* (2013.01); *H04W 8/20* (2013.01)
USPC ............................... 370/328; 370/338; 726/12

(58) Field of Classification Search
None
See application file for complete search history.

(56) References Cited

U.S. PATENT DOCUMENTS

| | | | | |
|---|---|---|---|---|
| 7,509,417 | B1 * | 3/2009 | Kammer et al. ............. 709/225 |
| 7,761,913 | B2 * | 7/2010 | Grandmaitre et al. ......... 726/12 |
| 7,822,861 | B2 * | 10/2010 | Annic ........................... 709/228 |
| 7,894,812 | B1 * | 2/2011 | Durig et al. ................ 455/432.3 |
| 8,166,537 | B1 * | 4/2012 | Viswanath et al. ............. 726/12 |
| 8,489,143 | B2 * | 7/2013 | Dong ........................... 455/558 |
| 8,594,016 | B2 * | 11/2013 | Lair ............................. 370/328 |
| 8,743,747 | B2 * | 6/2014 | Zhao et al. .................... 370/280 |
| 2005/0154780 | A1 * | 7/2005 | Sarja et al. ................... 709/203 |
| 2006/0168655 | A1 * | 7/2006 | Grandmaitre et al. ......... 726/12 |
| 2008/0049702 | A1 * | 2/2008 | Meylan et al. ............... 370/342 |
| 2009/0129280 | A1 | 5/2009 | Stout et al. |
| 2009/0161575 | A1 | 6/2009 | Zhao et al. |

(Continued)

FOREIGN PATENT DOCUMENTS

| | | |
|---|---|---|
| EP | 2276294 A1 | 1/2011 |
| WO | WO2009143761 A1 | 12/2009 |

OTHER PUBLICATIONS

International Search Report and Written Opinion—PCT/US2011/052150—ISA/EPO—Nov. 3, 2011.

*Primary Examiner* — Michael J Moore, Jr.
(74) *Attorney, Agent, or Firm* — Arent Fox LLP (57) ABSTRACT

A method is performed by a device. The method includes determining whether the device is allowed to attach to an operator network based at least partially on whether all access point names in a minimum access point name list are enabled in the device. The device allows itself to attach to the operator network if it is determined that the device is allowed to attach to the operator network. The device prevents itself from attaching to the operator network if it is determined that the device is not allowed to attach to the operator network. The device can wirelessly receive a command to disable an access point name in the device. If an access point name on a detach access point name list is disabled, then the device detaches from the operator network and prevents itself from reattaching until an integrated circuit card in the device is removed and replaced.

20 Claims, 8 Drawing Sheets

---

Determine whether the device is allowed to attach to an operator network based at least partially on whether all access point names in a minimum access point name list are enabled in the device    40

Allow the device to attach to the operator network if it is determined that the device is allowed to attach to the operator network, and Prevent the device from attaching to the operator network if it is determined that the device is not allowed to attach to the operator network.    41

(56) References Cited

U.S. PATENT DOCUMENTS

| | | | |
|---|---|---|---|
| 2009/0161582 A1* | 6/2009 | Kammer et al. | 370/254 |
| 2009/0245176 A1 | 10/2009 | Balasubramanian et al. | |
| 2010/0015973 A1 | 1/2010 | Islam et al. | |
| 2010/0195493 A1 | 8/2010 | Hedman et al. | |
| 2010/0303040 A1* | 12/2010 | Takamune | 370/331 |
| 2011/0103277 A1 | 5/2011 | Watfa et al. | |
| 2011/0103310 A1 | 5/2011 | Stojanovski et al. | |
| 2011/0310799 A1* | 12/2011 | Horn et al. | 370/328 |
| 2011/0319133 A1* | 12/2011 | Dong | 455/558 |
| 2012/0044915 A1* | 2/2012 | Oerton | 370/338 |
| 2013/0337808 A1* | 12/2013 | Zhao et al. | 455/435.3 |

* cited by examiner

Specify an access point name that is enabled in the device to the operator network to cause the operator network to provide the device with access to a packet data network that corresponds to the access point name — 42

Reattempt a connection to a packet data network without tearing down a Point-to-Point Protocol (PPP) context for the connection to the packet data network if the device is disconnected from the packet data network which is the last one that the device was connecting to and the access point name for the packet data network is on a particular access point name list — 80

FIG. 8

ACCESS POINT NAME LIST BASED NETWORK ACCESS MANAGEMENT

CROSS-REFERENCE TO RELATED PATENT APPLICATIONS

The present application claims priority to U.S. Provisional Patent Application Ser. No. 61/411,712, entitled "APN List Based Network Access Management on Multimode Devices," filed Nov. 9, 2010, the entirety of which is incorporated by reference herein.

FIELD OF INVENTION

Embodiments of the present invention relate generally to the field of wireless communications and, more particularly, to managing device access to operator networks.

BACKGROUND

A person desiring wireless communication typically purchases user equipment (UE), such as a cellular telephone, a personal digital assistant (PDA), a smart phone, a laptop, or the like. The person then typically signs a contract with a network operator for a subscription to use the operator's network for wireless communication. The network of the operator, called the operator network, typically includes base stations, access nodes, wireless modems, or the like, for wirelessly communicating with the user equipment. The operator network also typically includes gateways to packet data networks (PDNs), such as the Internet, private networks, or the like, which the user equipment can access through the operator network.

In order for the user equipment to access a desired packet data network, the user equipment typically specifies to the operator network an access point name (APN) that corresponds to the desired packet data network. For example, if user equipment is wirelessly connected to an operator network and the user of the user equipment enters a command to access the Internet, the user equipment would specify to the operator network an access point name that corresponds to the Internet. The user equipment could then receive data services through the operator network from the packet data network represented by the access point name.

SUMMARY OF THE DISCLOSURE

Systems and methods in accordance with various embodiments allow for a device, such as user equipment, to manage access of the device to an operator network. The device stores one or more lists of access point names, and each list of access point names can be used for network access management. The device also stores one or more enable/disable control parameters for each access point name, to indicate whether the device is allowed to access the packet data network represented by the access point name. The device controls access of the device to the operator network based at least partially on the one or more lists of access point names and the one or more enable/disable control parameters for each access point name.

An operator can specify some specific access point names to be mandatory, such that the operator does not allow a device to attach to the operator network if the mandatory access point names are not enabled in the device. In some embodiments, the mandatory access point names specified by the operator are stored as a minimum access point name list in the device, which lists the access point names that at a minimum must be enabled in the device to allow the device to attach to the operator network. The device can then enforce the operator's requirements for determining whether the device is allowed to attach to the operator network.

A method performed by a device in accordance with an embodiment includes (i) determining whether the device is allowed to attach to an operator network based at least partially on whether all access point names in a minimum access point name list are enabled in the device; (ii) allowing the device to attach to the operator network if it is determined that the device is allowed to attach to the operator network; and (iii) preventing the device from attaching to the operator network if it is determined that the device is not allowed to attach to the operator network. Checking for the enablement of the access point names in the minimum access point name list can be referred to as an access point name check procedure. In various embodiments, the device performs the access point name check procedure for all access point names listed in the minimum access point name list after power-up of the device or upon software reset of the device.

The mandatory access point names can also be different for different radio technologies, so there can be separate minimum access point name lists for each radio technology and for each network control purpose. In some embodiments, the device selects the minimum access point name list to be used for the check procedure from among a plurality of possible minimum access point name lists based on a type of radio technology to be used by the device. For example, the device may select a different minimum access point name list for the use of Long Term Evolution (LTE) radio technology than is selected for evolved High Rate Packet Data (eHRPD) radio technology. With such an access point name list based solution, the operator can provision the lists differently for the different radio technologies.

In some embodiments, the device stores an enable/disable control parameter for each access point name in an application profile in a memory in the device, and the device performs the access point name check procedure by checking whether the control parameter for each access point name of the minimum access point name list is enabled in the application profile. In some embodiments, the device stores an enable/disable control parameter for each access point name in an Extended File (EF) in a Universal Integrated Circuit Card (UICC) that is inserted into the device, and the device performs the access point name check procedure by checking whether the control parameter for each access point name of the minimum access point name list is enabled in the Extended File. In further embodiments, the device stores enable/disable control parameters for each access point name in both an application profile and in an Extended File, and the check procedure checks for enablement of the access point names of the minimum access point name list in both the application profile and the Extended File.

In various embodiments, the device is able to receive commands over-the-air through wireless communication that specify one or more access point names to be disabled in the device. The operator may disable access point names in the device through wireless communication, for example, due to a user of the device failing to pay a bill for a subscription service, the device being stolen, or for other reasons. The operator may also specify some specific access point names such that the device will be detached from the operator network and may be forbidden from accessing the operator network if such access point names are disabled by over-the-air provisioning. Such access point names may be stored in another minimum access point name list in the device, which may be called a detach minimum access point name list. In some embodiments, if the device wirelessly receives a command to disable an access point name that is on the detach minimum access point name list, then the device detaches from the operator network and prevents itself from attempting to reattach to the operator network until a UICC in the device is removed and replaced.

In some embodiments, the device stores another minimum access point name list, and if a connection to a packet data network corresponding to any access point name on the list is disconnected, then the device maintains a Point-to-Point Protocol (PPP) context for the connection. In such embodiments, the device is then allowed to reattempt a connection to the packet data network without tearing down the PPP context. Such embodiments would allow for automatically reconnecting to a packet data network without telling an application executing on the device that a PPP context for the connection has been torn down.

Different access point name lists can be maintained in the device for different purposes of allowing or disallowing access to an operator network or the use of a radio technology with the operator network. An operator can have the flexibility to provision the access point name lists in the devices based on its own requirements, and the requirements can be per radio technology, so there can be separate access point name lists for each radio technology for each network control purpose. In accordance with various embodiments, different operators can provision their requirements differently by employing different access point name lists, and operators can provision different requirements with respect to different radio technologies. Various embodiments, therefore, provide a generalized solution for a device to enforce operator requirements for network access.

DETAILED DESCRIPTION

Figure 1:
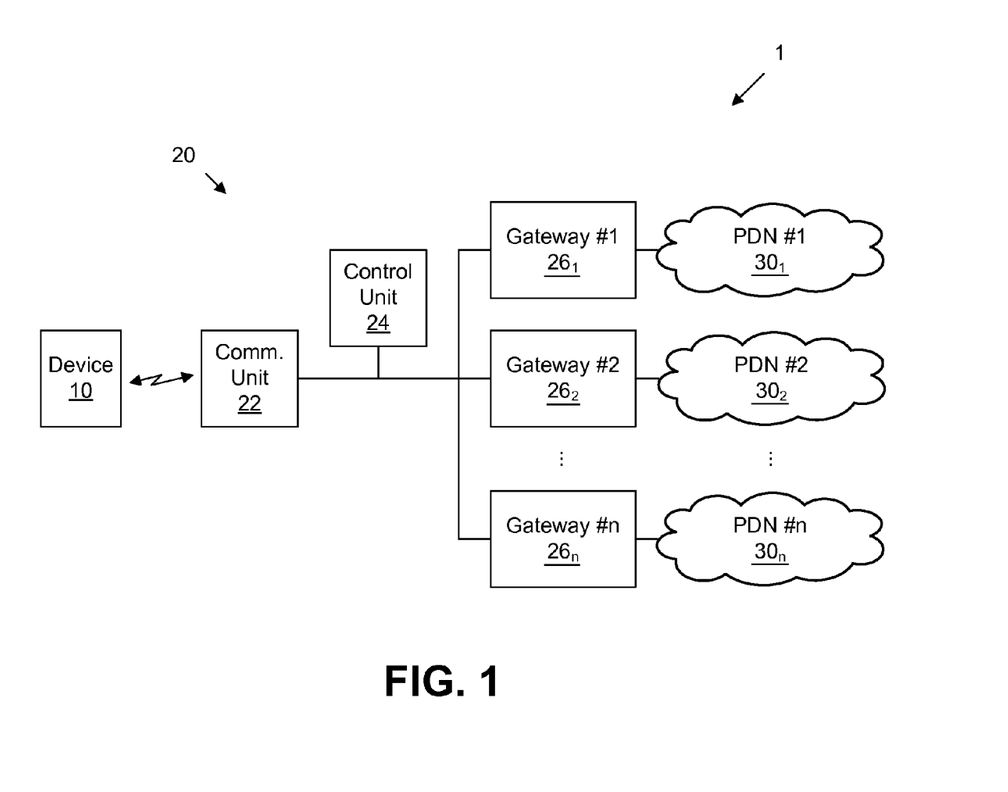
FIG. 1 illustrates a system that includes a device, an operator network, and a plurality of packet data networks.

FIG. 1 illustrates a system 1 in accordance with an embodiment that includes a device 10, an operator network 20, and a plurality of packet data networks (PDNs) $30_1, 30_2, \ldots, 30_n$. The operator network 20 includes a communication unit 22, a control unit 24, and a plurality of gateways $26_1, 26_2, \ldots, 26_n$. The device 10 is user equipment (UE), such as a cellular telephone, a personal digital assistant (PDA), a smart phone, a laptop, a computing device, or the like, that is capable of performing wireless communication with the communication unit 22 of the operator network 20. The communication unit 22 of the operator network 20 is a base station, an access node, a wireless modem, a wireless node, a Node B, an evolved NodeB (eNB), a transceiver, or the like, for wirelessly communicating with the device 10.

Each of the gateways $26_1, 26_2, \ldots, 26_n$ of the operator network 20 provides access to a corresponding one of the packet data networks $30_1, 30_2, \ldots, 30_n$. In the exemplary embodiment of FIG. 1, there are "n" gateways that each provide connectivity to a corresponding packet data network, where "n" is an integer value, and it should be understood that there may be any number of gateways and packet data networks in the system 1. The control unit 24 of the operator network 20 is a computer, a computing device, a router, a controller, a control device, or the like, for controlling various components in the operator network 20. In various embodiments, the control unit 24 controls an exchange of packets, frames, digital information, or other data between the communication unit 22 and the gateways $26_1, 26_2, \ldots, 26_n$.

The packet data networks $30_1, 30_2, \ldots, 30_n$ can be any type of packet data networks, such as the Internet, a private network, an administration network, or the like. Each of the packet data networks $30_1, 30_2, \ldots, 30_n$ is associated with a corresponding access point name (APN). To access a desired packet data network, the device 10 specifies an access point name associated with the packet data network to the operator network 20, and the operator network 20 uses a gateway that corresponds to the packet data network to provide the device 10 with access to the packet data network. In such a manner, the device 10 can receive data services through the operator network 20 from the packet data networks $30_1, 30_2, \ldots, 30_n$, which are represented by access point names.

Figure 2:
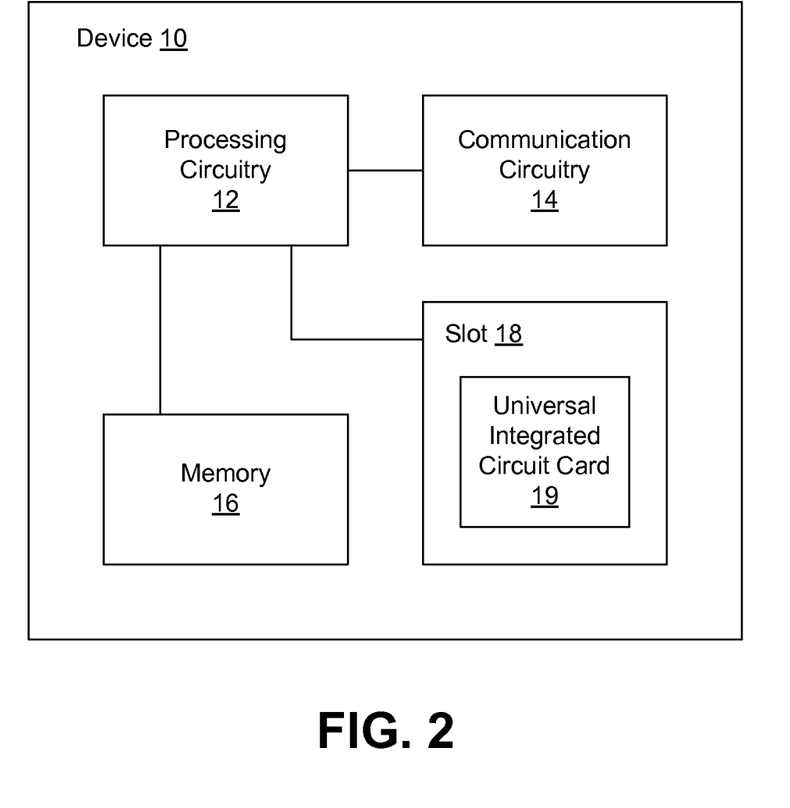
FIG. 2 illustrates an exemplary design for a device in accordance with an embodiment.

FIG. 2 illustrates an exemplary design for the device 10 in accordance with an embodiment. The device 10 includes processing circuitry 12, communication circuitry 14, memory 16, and a slot 18. The slot 18 is configured to receive a universal integrated circuit card (UICC) 19, such as a subscriber identity module (SIM) card, or the like. The UICC 19 can be inserted into the slot 18 and can be removed from the slot 18. The memory 16 is readable by the processing circuitry 12, and the memory 16 can store programs, data, and the like. The communication circuitry 14 comprises a transceiver, or the like, and is configured to perform wireless communication and may be controlled by the processing circuitry 12. The processing circuitry 12 can read data from the UICC 19 when the UICC 19 is inserted into the slot 18. In various embodiments, the processing circuitry 12 comprises a processor, or the like, for executing software, firmware, or the like. In some embodiments, the processing circuitry 12, the communication circuitry 14, and the memory 16 may all be combined on a single chip in the device 10.

With reference to FIGS. 1 and 2, the ability of the device 10 to connect to each of the packet data networks $30_1, 30_2, \ldots, 30_n$ through the operator network 20 can be controlled in the device 10 individually for each packet data network. The device 10 has one or more enable/disable control parameters for each access point name, and each access point name is associated with a corresponding packet data network. In various embodiments, the device 10 only allows a connection to a packet data network if the access point name corresponding to the packet data network is enabled in the device 10.

In various embodiments, the device 10 stores an application profile in the memory 16, where the application profile includes enable/disable control parameters for access point names. For example, an application profile stored in the memory 16 of the device 10 may have a bit for each access point name, and the bit for an access point name may be set to a value of "1" if the access point name is enabled or a value of "0" if the access point name is disabled. In such embodiments, if a user of the device 10 performs an operation with the device 10 that requests use of a packet data network, the processing circuitry 12 of the device 10 would read the bit for the access point name corresponding to the desired packet data network from the application profile in the memory 16, and the processing circuitry 12 would only allow for a connection to the desired packet data network if the bit indicates that the access point name for the packet data network is enabled. If the bit indicates that the access point name is disabled, then the processing circuitry 12 would prevent the device 10 from connecting to the corresponding packet data network.

Thus, in various embodiments, the device 10 stores an application profile that includes entries for various access point names to be used by applications on the device 10, and the application profile further includes an additional entry for each access point name to indicate whether the access point name is enabled or disabled for the device 10. As discussed above, the enabled/disabled information for each access point name could be specified by a bit associated with the access point name, where a value of "1" indicates enabled and a value of "0" indicates disabled. When the device 10 is first provided to a user, the enabled/disabled bits for the access point names in the application profile could be set based on services in a subscription purchased by the user.

In some embodiments, the UICC 19 stores an Extended File (EF) where the Extended File includes enable/disable control parameters for access point names. For example, an Extended File stored in the UICC 19 may have a bit for each access point name, and the bit for an access point name may be set to a value of "1" if the access point name is enabled or a value of "0" if the access point name is disabled. In such embodiments, if a user of the device 10 performs an operation with the device 10 that requests use of a packet data network, the processing circuitry 12 of the device 10 would read the bit for the access point name corresponding to the desired packet data network from the Extended File in the UICC 19, and the processing circuitry 12 would only allow for a connection to the desired packet data network if the bit indicates that the access point name for the packet data network is enabled. If the bit indicates that the access point name is disabled, then the processing circuitry 12 would prevent the device 10 from connecting to the corresponding packet data network. In some embodiments, if an access point name is listed in a specific place in the Extended File, then it is assumed that the access point name is enabled in the Extended File, without requiring an extra bit to specify enabled/disabled.

In some embodiments, enable/disable control parameters for access point names can be stored in both an application profile in the memory 16 and in an Extended File in the UICC 19. In such embodiments, an access point name is enabled for the device 10 if (i) the access point name is listed and enabled in the application profile in the memory 16; and (ii) the access point name is listed and enabled in the Extended File in the UICC 19 or the Extended File does not exist. The processing circuitry 12 can perform an application profile check to determine whether the access point name is listed and enabled in the application profile. The processing circuitry 12 can also perform a UICC APN check to determine whether the Extended File exists in the UICC 19 and, if so, whether the access point name is listed and enabled in the Extended File.

According to the various above described embodiments, the device 10 is able to determine whether an access point name is an enabled access point name for the device 10. An enabled access point name is an access point name for which a packet data network connection is allowed to be established. In various embodiments, the device 10 only requests a packet data network connection if the associated access point name is enabled in the device 10. In such embodiments, if the associated access point name for a packet data network is disabled in the device 10, then the processing circuitry 12 prevents the device 10 from connecting to the packet data network.

In various embodiments, an operator of the operator network 20 can specify some access point names to be mandatory, such that the operator will not allow the device 10 to attach to the operator network 20 if any of the mandatory access point names are disabled in the device 10. The mandatory access point names can be specified in a minimum access point name list. The minimum access point name list can include zero, one, or a plurality of access point names that must be enabled in the device 10 for the device 10 to attach to the operator network 20. Such a first type of minimum access point name list may also be called a "MinAPNList1." The minimum access point name list allows for enforcing an operator's requirements to make some certain access point names mandatory for the device 10 to be able to attach to the operator network 20. In various embodiments, to attach to the operator network 20 all access point names in the minimum access point name list must be enabled in the device 10.

In some embodiments, the minimum access point name list is stored in the memory 16 in the device 10 when the device 10 is first provided to the user. In some embodiments, the minimum access point name list is transmitted to the device 10 wirelessly over the air and stored in the memory 16 in the device 10. In various embodiments, the processing circuitry 12 of the device 10 must check the enabled/disabled bits for each access point name specified in the minimum access point name list, and only if they are all enabled in the device 10 can the device 10 attach to the operator network 20. In such a manner, the device 10 can enforce an operator's requirements for enabled access point names for connections to the operator network 20.

Figure 3:
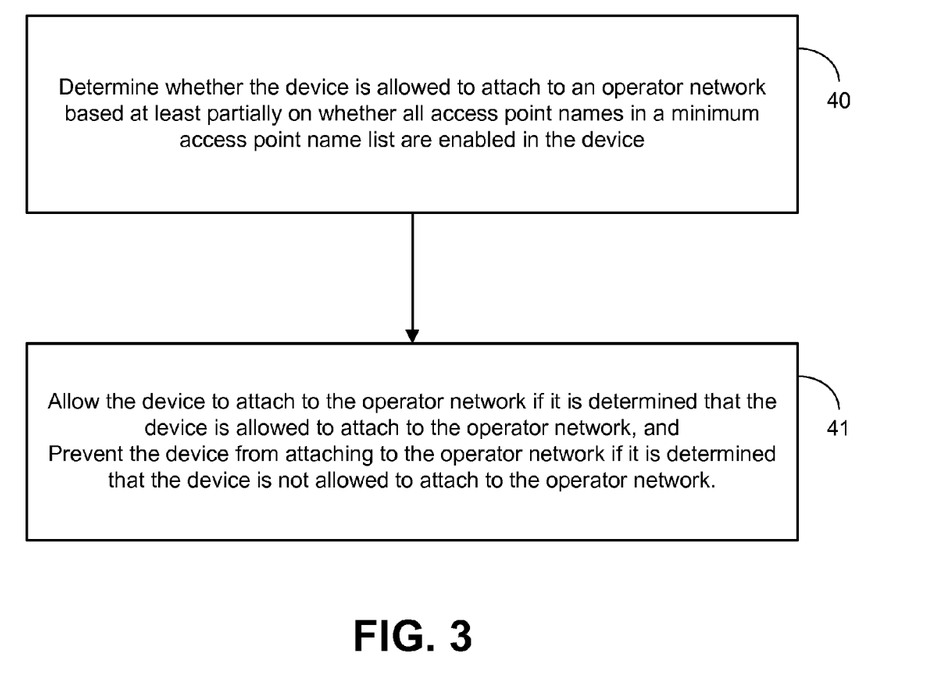
FIG. 3 is a flowchart of a method.

FIG. 3 illustrates a flowchart of a method in accordance with an embodiment. With reference to FIGS. 1, 2, and 3, in step 40 the device 10 determines whether the device 10 is allowed to attach to the operator network 20 based at least partially on whether all access point names in a minimum access point name list are enabled in the device 10. In various embodiments, the determination in step 40 is performed by the processing circuitry 12 by obtaining access point names from a minimum access point name list stored in the memory 16 and then checking whether those access point names are enabled in the device 10. The method then continues to step 41.

In step 41, the device 10 allows itself to attach to the operator network 20 if it has been determined in step 40 that the device 10 is allowed to attach to the operator network 20, and the device 10 prevents itself from attaching to the operator network 20 if it has been determined in step 40 that the device 10 is not allowed to attach to the operator network 20. If the device 10 is allowed to attach to the operator network 20, the processing circuitry 12 can control the communication circuitry 14 to communicate with the communication unit 22 of the operator network 20 to attach to the operator network 20.

In various embodiments, the minimum access point name list includes a plurality of access point names. Also, in various embodiments, the determining in step 40 is performed when the device 10 powers-up or when there is a software reset of the device 10. Thus, in various embodiments, the device 10 performs the access point name check procedure for all of the access point names listed in the minimum access point name list after power-up or software reset.

Various different minimum access point name lists could be provided for different radio technologies and stored in the memory 16. In various embodiments, the processing circuitry 12 of the device 10 selects a minimum access point name list from among a plurality of possible minimum access point name lists to be used for the determination in step 40 based on a type of radio technology to be used by the device 10. For example, the processing circuitry 12 of the device 10 may select a different minimum access point name list for the use of Long Term Evolution (LTE) radio technology than is selected for evolved High Rate Packet Data (eHRPD) radio technology. An operator, therefore, can provision different requirements with respect to different radio technologies by providing different minimum access point name lists. In various embodiments, if the radio technology is eHRPD and it is determined that the device 10 is not allowed to attach to the operator network 20, then the device 10 does not advertise eHRPD personality. Also, in various embodiments, if the radio technology is LTE and it is determined that the device 10 is not allowed to attach to the operator network 20, then the device 10 disables LTE and does not attach to LTE.

In various embodiments, an access point name is enabled in the device 10 if a control parameter for the access point name that is stored in an application profile in the memory 16 is enabled. In some embodiments, an access point name is enabled in the device 10 if a control parameter for the access point name that is stored in an application profile in the memory 16 of the device 10 is enabled and another control parameter for the access point name that is stored in an Extended File in the universal integrated circuit card 19 inserted into the slot 18 of the device 10 is enabled.

Figure 4:
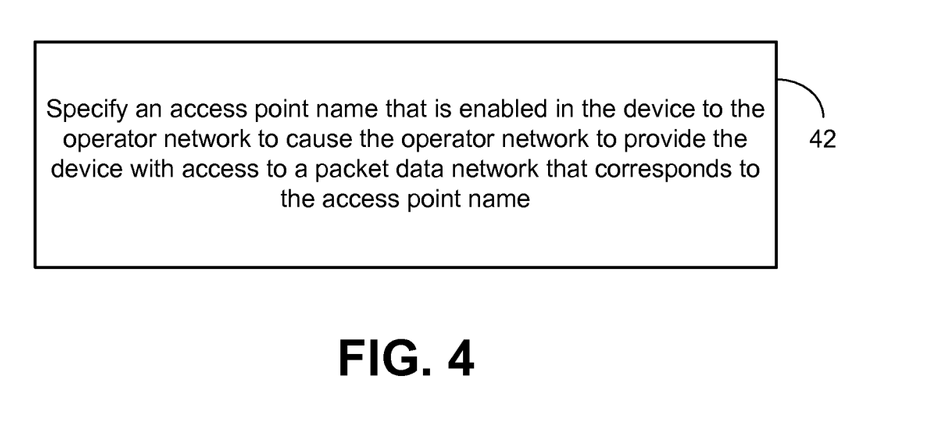
FIG. 4 illustrates a method.

FIG. 4 illustrates a method in accordance with an embodiment. The method of FIG. 4 may be performed after the method of FIG. 3 if the device in step 41 is allowed to connect to the operator network. With reference to FIGS. 1, 2, and 4, in step 42 the device 10 specifies an access point name that is enabled in the device 10 to the operator network 20 to cause the operator network 20 to provide the device 10 with access to a packet data network that corresponds to the access point name. The device 10 can then receive data services from the packet data network through the operator network 20. In various embodiments, the processing circuitry 12 of the device 10 controls the communication circuitry 14 of the device 10 to transmit an indication of the access point name for the desired packet data network to the communication unit 22 of the operator network 20.

Figure 5:
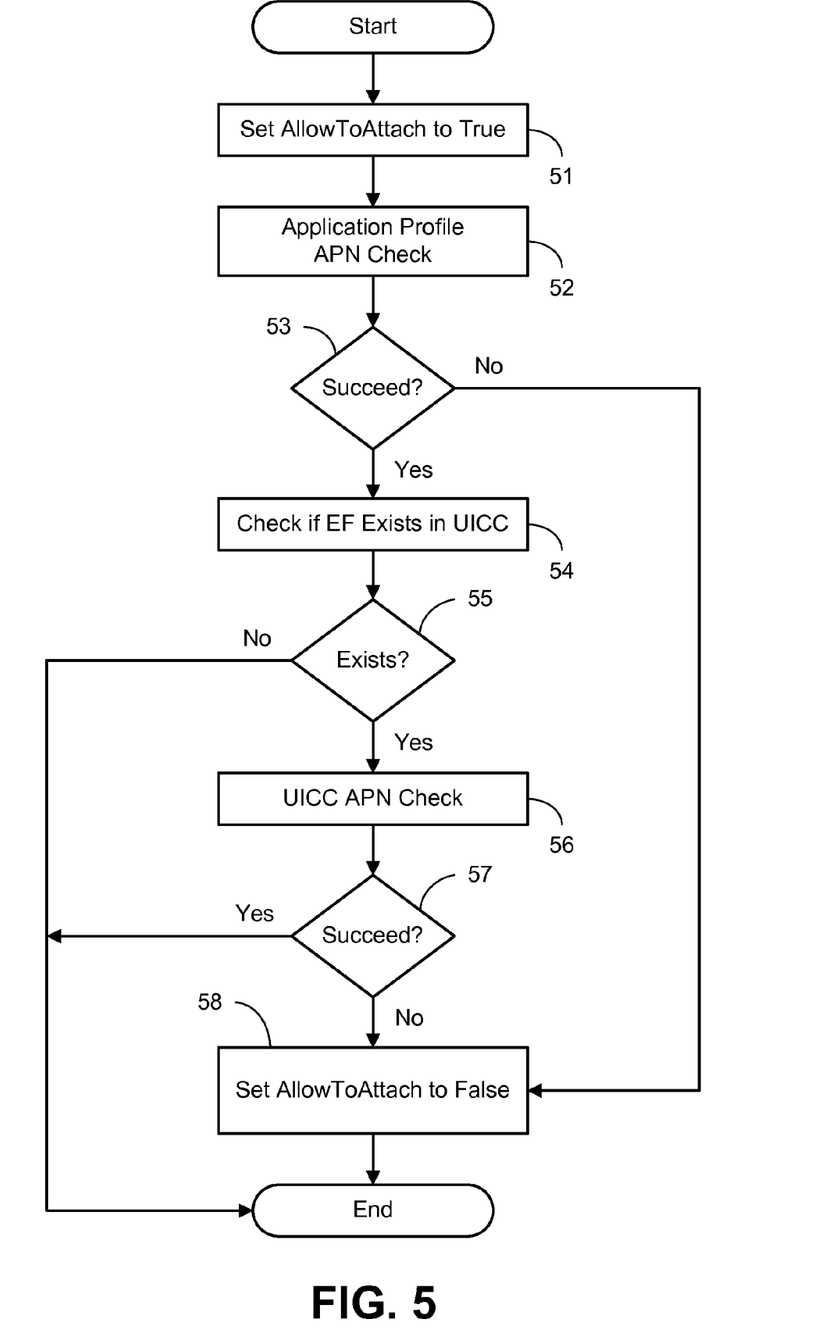
FIG. 5 is a flowchart of an exemplary method that may be used to determine whether a device is allowed to attach to an operator network.

FIG. 5 illustrates a flowchart of an exemplary method that may be used for step 40 of FIG. 3 to determine whether a device is allowed to attach to an operator network. The method of FIG. 5 is a check procedure for access point names listed in a minimum access point name list. The check procedure may be triggered by and performed after power-up or software reset. With reference to FIGS. 1, 2, and 5, the device 10 stores an AllowToAttach flag. A value of the AllowToAttach flag at the end of the check procedure indicates whether the device 10 is allowed to access the operator network 20. If the access point name check for the minimum access point name list succeeds, then the AllowToAttach flag will have a value of "True." On the other hand, if any access point name in the minimum access point name list is not enabled, then the device 10 sets the AllowToAttach flag to a value of "False." In various embodiments, the method is performed by the processing circuitry 12 of the device 10.

At the beginning of the check procedure in step 51, the device 10 sets the AllowToAttach flag to "True," and the method proceeds to step 52. In step 52, the device 10 performs an application profile access point name check for all access point names listed in the minimum access point name list. If all access point names from the minimum access point name list are enabled in the application profile, then the check succeeds at step 53, and the method continues to step 54. On the other hand, if there is any one access point name from the minimum access point name list that is disabled in the application profile in the device 10, then the check fails at step 53, and the method continues to step 58. The application profile may be stored in the memory 16 of the device 10, and the processing circuitry 12 of the device 10 may perform the check of step 52.

In step 54, the device 10 checks if an Extended File exists in the UICC 19. If the Extended File does not exist in the UICC 19, then the existence decision at step 55 is "no," and the method ends with the AllowToAttach flag set to "True." On the other hand, if the Extended File does exist in the UICC 19, then the existence decision at step 55 is "yes," and the method continues to step 56. In step 56, the device 10 checks if all access point names in the minimum access point name list are also listed in the Extended File. If all of the access point names from the minimum access point list are listed in the Extended File, then the check succeeds at step 57, and the method ends with the AllowToAttach flag set to "True." On the other hand, if there is any one access point name from the minimum access point list that is not present in the Extended File, then the check fails at step 57, and the method continues to step 58. In step 58 the device 10 sets the AllowToAttach flag to "False," and then the method ends.

Once the check procedure has been completed, if the AllowToAttach flag is "True," then the device 10 is allowed to access the operator network 20. If the check procedure ends and the AllowToAttach flag is "False," then the device 10 does not advertise eHRPD personality if the check was for the eHRPD radio technology, and the device 10 disables LTE and does not attach to LTE if the check was for the LTE radio technology.

Figure 6:
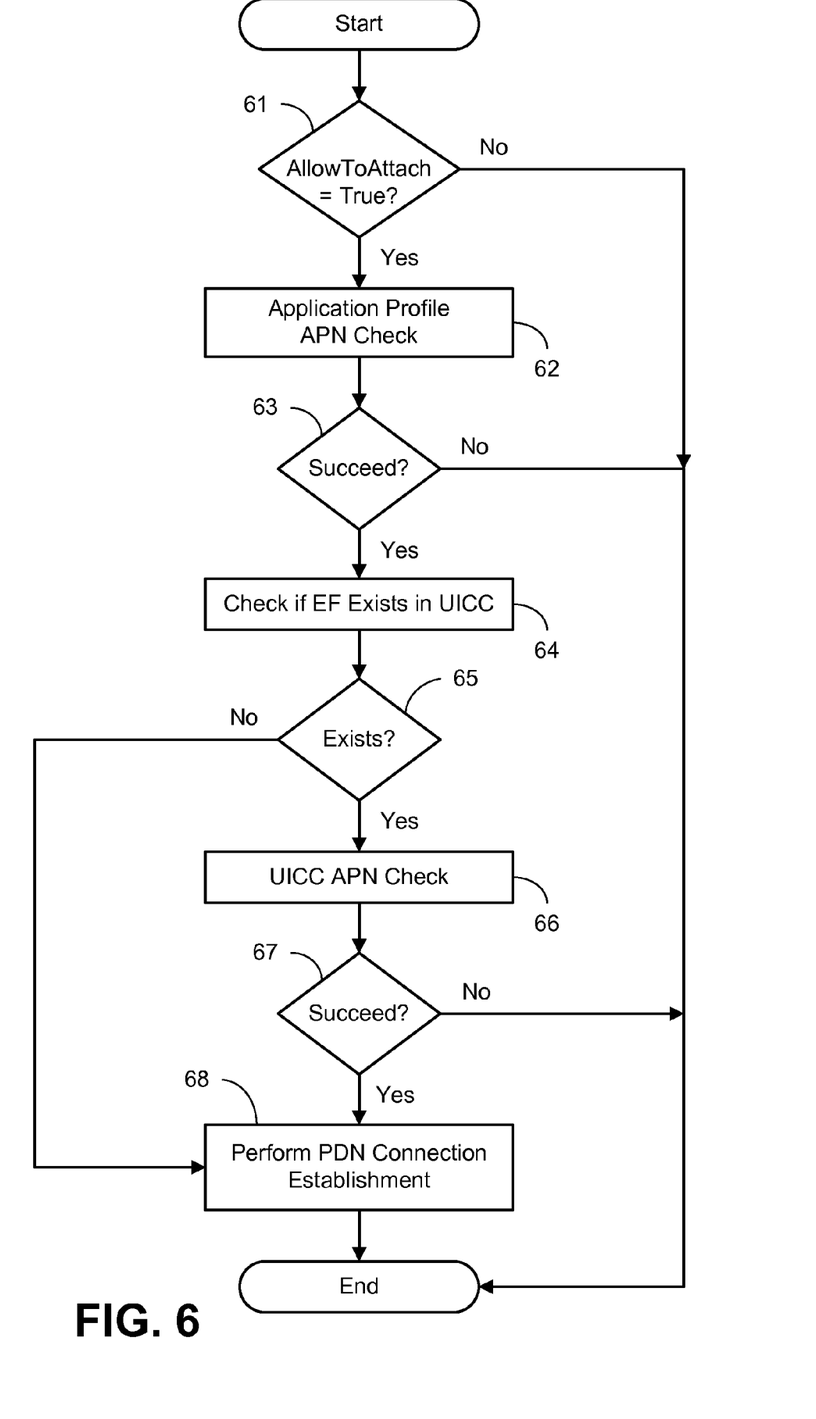
FIG. 6 is a flowchart of a method.

FIG. 6 illustrates a flowchart of a method that can be used by a device to perform an access point name check for an access point name that is not listed in a minimum access point name list before the device requests a packet data network connection. With reference to FIGS. 1, 2, and 6, the method may be performed by the device 10. In step 61, upon receiving a packet data network connection request from an application, the device 10 checks the AllowToAttach flag. If the AllowToAttach flag has a value of "True," then the method continues to step 62. On the other hand, if the AllowToAttach flag has a value of "False," then the method ends without establishing a packet data network connection, because the device 10 cannot access a packet data network through the operator network 20 if the device is not attached to the operator network 20.

In step 62, the device 10 checks the application profile, and if the access point name for the desired packet data network connection is set to enabled in the application profile, then the check succeeds at step 63, and the method continues to step 64. On the other hand, if the access point name for the desired packet data network connection is set to disabled in the application profile, then the check fails at step 63, and the method ends without establishing the packet data network connection.

In step 64, the device 10 checks if an Extended File exists in the UICC 19. If the Extended File does exist in the UICC 19, then the determination of existence is "Yes" in step 65, and the method continues to step 66. On the other hand, if the Extended File does not exist in the UICC 19, then the determination of existence is "No" in step 65, and the method continues to step 68. In step 66, the device 10 checks if the access point name for the desired packet data network connection is listed in the Extended File. If the access point name is listed in the Extended File, then the check succeeds at step 67, and the method continues to step 68. On the other hand, if the access point name is not listed in the Extended File, then the check fails at step 67, and the method ends without establishing the packet data network connection. In step 68, the device 10 proceeds with the packet data network connection establishment for the packet data network associated with the access point name, and then the method ends.

With reference to FIGS. 1 and 2, in various embodiments an operator of the operator network could update enabled/disabled control parameters in the device 10 for various access point names. For example, if a user fails to pay a bill for service, upgrades to a service with more features, or if the device 10 is stolen, then the operator may send a command wirelessly over the air to the device 10 to update enabled/disabled control parameters for various access point names in the device 10.

In various embodiments, the operator of the operator network 20 could also specify a list of some specific access point names, which if disabled by the operator over the air in the device 10 would cause the device 10 to detach from the operator network 20 and not attempt to reattach to any access point name until the UICC 19 were removed and replaced for the device 10. Such an operation could be useful, for example, if a device 10 is lost or stolen. The operator could change a bit from enabled to disabled over the air for a specific access point name in the device 10 to cause the device 10 to detach from the operator network 20 and not attempt to reattach.

In various embodiments, a minimum access point name list could be specified in the device 10 with access point names that if disabled in the device 10 would cause the device 10 to detach from the operator network 20. Such a minimum access point name list may be called a detach minimum access point name list or a "MinAPNList2." Thus, various embodiments allow for disconnecting the device 10 from the operator network 20 by disabling some certain access point names through over-the-air procedures. A detach minimum access point name list may specify access point names for which if the device 10 is already attached to the operator network 20 and needs to connect to a packet data network represented by an access point name in the list but the access point name is not enabled, then the device 10 detaches itself from the operator network 20 and does not attempt to reattach to any access point name until the UICC 19 is removed and replaced. In such a way, the operator of the operator network 20 can detach the device 10 by disabling any access point name in the detach minimum access point name list over the air.

Figure 7:
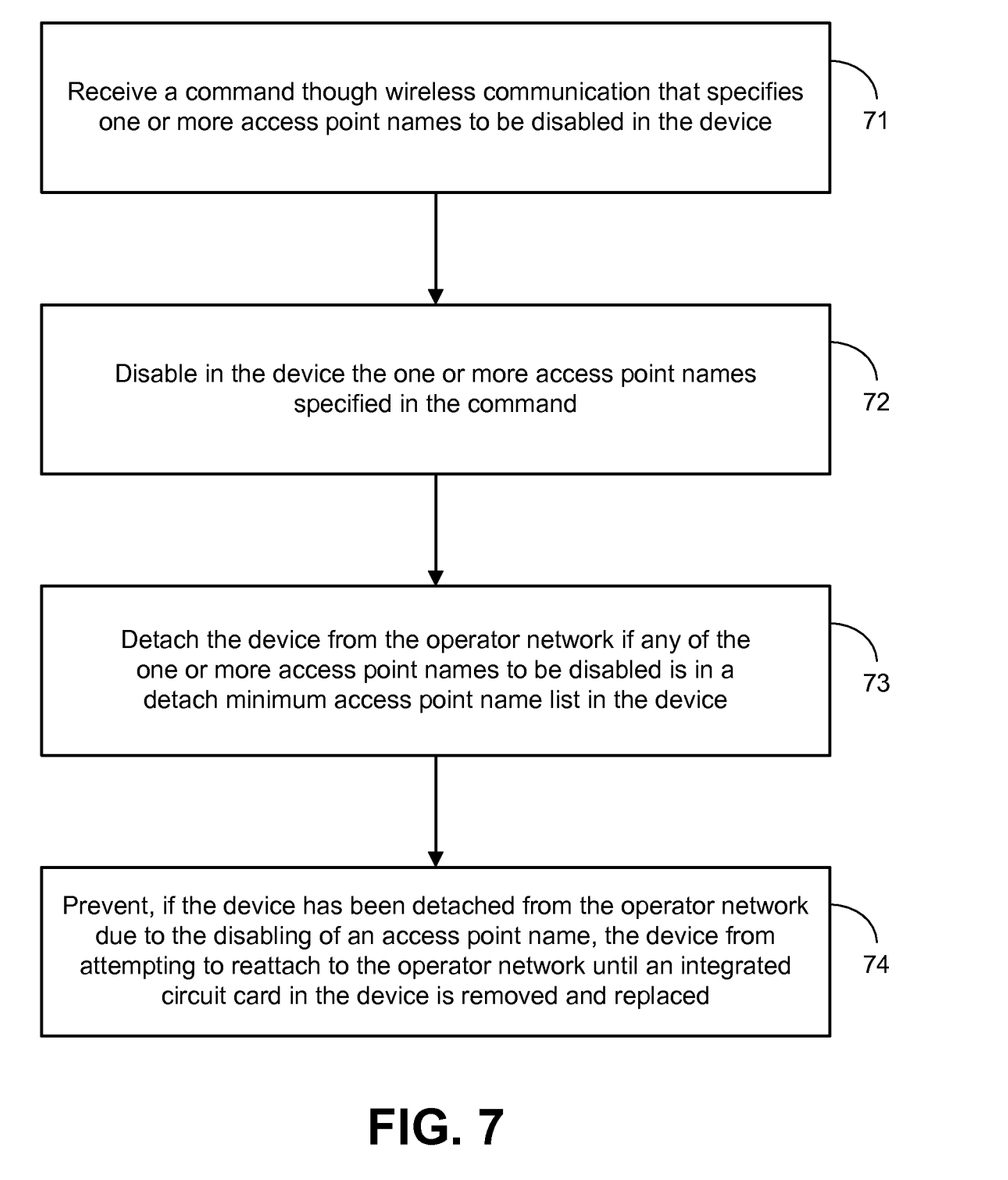
FIG. 7 is a flowchart of a method.

FIG. 7 illustrates a flowchart of a method that can be performed by a device in accordance with an embodiment. With reference to FIGS. 1, 2, and 7, in step 71 the device 10 receives a command through wireless communication that specifies one or more access point names to be disabled in the device 10, and the method continues to step 72. The receiving of the command may be performed by the communication circuitry 14 of the device 10. In step 72, the device 10 disables in the device 10 the one or more access point names specified in the command, and the method continues to step 73. The disabling of the one or more access point names may be performed by the processing circuitry 12 of the device 10.

In step 73, the device 10 detaches itself from the operator network 20 if any of the one or more access point names to be disabled is in a detach minimum access point name list in the device 10, and the method continues to step 74. The detachment may be performed by the processing circuitry 12 controlling the communication circuitry 14 to detach from the operator network 20. In step 74, the device 10 prevents, if the device 10 has been detached from the operator network 20 due to the disabling of an access point name, the device 10 from attempting to reattach to the operator network 20 until the UICC 19 in the device is removed and replaced. The processing circuitry 12 in the device 10 may perform the preventing step.

In some embodiments, the device 10 stores another minimum access point name list, and if a connection to a packet data network corresponding to any access point name on the list is disconnected, then the device 10 maintains a Point-to-Point Protocol (PPP) context for the connection. Such a minimum access point name list may be called a PPP minimum access point name list or a MinAPNList3. In such embodiments, the device 10 is then allowed to reattempt a connection to the packet data network without tearing down the PPP context. Such embodiments would allow for automatically reconnecting to a packet data network without telling an application executing on the device 10 that a PPP context for the connection has been torn down.

Figure 8:
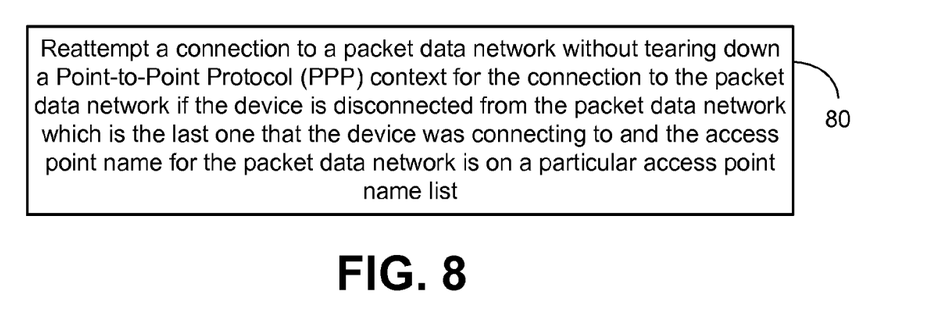
FIG. 8 illustrates a method.

FIG. 8 illustrates a method in accordance with an embodiment. With reference to FIGS. 1, 2, and 8, in step 80 the device 10 reattempts a connection to a packet data network, such as one of the packet data networks $30_1, 30_2, \ldots, 30_n$, without tearing down a PPP context for the connection to the packet data network if the device 10 is disconnected from the packet data network which is the last one that the device 10 was connecting to and the access point name for the packet data network is on the PPP minimum access point name list. Various embodiments allow for maintaining a PPP context if a packet data network connection related to a certain access point name is disconnected and there are no other active packet data network connections. Also, various embodiments allow for an application to reattempt a packet data network connection without tearing down PPP if the packet data network connection is associated with an access point name in a PPP minimum access point name list.

With reference again to FIGS. 1 and 2, in various embodiments, the device 10 includes the processing circuitry 12 and the communication circuitry 14. In various embodiments, the processing circuitry 12 is configured to determine whether the device 10 is allowed to attach to the operator network 20 based at least partially on whether all access point names in a minimum access point name list are enabled in the device 10. The communication circuitry 14 allows for wireless communication. In some embodiments, the processing circuitry 12 is further configured to allow the device 10 to attach to the operator network 20 using the communication circuitry 14 if it is determined that the device 10 is allowed to attach to the operator network 20, and the processing circuitry 12 is configured to prevent the device 10 from attaching to the operator network 20 if it is determined that the device 10 is not allowed to attach to the operator network 20.

In various embodiments, the processing circuitry 12 is configured to select the minimum access point name list from among a plurality of possible minimum access point name lists based on a type of radio technology to be used by the device 10. In some embodiments, the processing circuitry 12 is configured to select a different minimum access point name list for the use of Long Term Evolution (LTE) radio technology than is selected for evolved High Rate Packet Data (eHRPD) radio technology.

In various embodiments, the communication circuitry 14 is configured to receive a command through wireless communication that specifies one or more access point names to be disabled in the device 10. In some embodiments, the processing circuitry 12 is configured to disable in the device 10 the one or more access point names specified in the command. In further embodiments, the processing circuitry 12 is configured to control the communication circuitry 14 to detach the device 10 from the operator network 20 if any of the one or more access point names to be disabled is in a detach minimum access point name list in the device 10. In some embodiments, the processing circuitry 12 is configured to prevent, if the device 10 has been detached from the operator network 20 due to the disabling of an access point name, the device 10 from attempting to reattach to the operator network 20 until the UICC 19 in the device 10 is removed and replaced.

In various embodiments, the processing circuitry 12 is configured to control the communication circuitry 14 to reattempt a connection to a packet data network without tearing down a Point-to-Point Protocol (PPP) context for the connection to the packet data network if the device 10 is disconnected from the packet data network and the access point name for the packet data network is on a particular access point name list.

A non-transitory processor readable storage medium in accordance with various embodiments stores a program that when executed on a processor of a device causes the processor to perform a method including (i) determining whether the device is allowed to attach to an operator network based at least partially on whether all access point names in a minimum access point name list are enabled in the device; (ii) allowing the device to attach to the operator network if it is determined that the device is allowed to attach to the operator network; and (iii) preventing the device from attaching to the operator network if it is determined that the device is not allowed to attach to the operator network.

In various embodiments, the configuring of circuitry may involve firmware or software that is executable by the circuitry. Certain embodiments have been described above in connection with a device. The device could also be called user equipment or a user terminal, and may contain some or all of the functionality of a subscriber unit, a mobile wireless terminal, a mobile device, a remote terminal, a wireless communication device, a wireless communication apparatus, or a user agent. User equipment could include a cellular telephone, a cordless telephone, a Session Initiation Protocol (SIP) phone, a smart phone, a personal digital assistant (PDA), a laptop, a handheld communication device, a handheld computing device, a satellite radio, a wireless modem card, and/or another processing device for communicating over a wireless system. Moreover, various aspects are described above in connection with a communication unit of an operator network. A communication unit may be utilized for communicating with one or more wireless terminals and can also be called, and may contain some or all of the functionality of, an access point, a node, a wireless node, a Node B, an evolved NodeB (eNB), or some other network entity. A communication unit may communicate via an over the air interface with wireless terminals. The communication may take place through one or more sectors. The communication unit can act as a router between the wireless terminals and the rest of an access network, which can include an Internet Protocol (IP) network, by converting received air interface frames to IP packets. The communication unit may also coordinate management of attributes for the air interface, and may also be a gateway between a wired network and the wireless network.

Various aspects, embodiments, or features have been presented above in terms of systems that may include a number of devices, components, modules, units, and the like. It is to be understood and appreciated that the various systems may include additional devices, components, modules, units, and so on, and/or may not include all of the devices, components, modules, units, and so on, discussed in connection with the figures. A combination of these approaches may also be used.

It will be appreciated that the memories that are described in connection with the various disclosed embodiments can be either volatile memory, nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), a hard drive, flash memory, or the like. Volatile memory can include random access memory (RAM), or the like. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

In various embodiments, a device and a communication unit of an operator network may communicate by way of any suitable wireless protocol, including but not limited to, Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

It is to be understood that various embodiments and features that are described herein may be implemented by hardware, software, firmware or any combination thereof. Various embodiments described herein are described in the general context of methods or processes, which may be implemented in one embodiment by a computer program product, embodied in a non-transitory computer-readable or processor-readable storage medium, including processor-executable instructions, such as program code. As noted above, a memory and/or a computer-readable storage medium may include removable and non-removable storage devices including, but not limited to, Read Only Memory (ROM), Random Access Memory (RAM), compact discs (CDs), digital versatile discs (DVD), hard drives, flash memory, and the like. Therefore, various disclosed embodiments can be implemented as program code on a variety of non-transitory computer-readable storage media.

The various illustrative circuitry described in connection with various aspects disclosed herein may be implemented or performed with a general purpose processor, a digital signal processor (DSP), an application specific integrated circuit (ASIC), a field programmable gate array (FPGA), custom circuitry, a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software code may be stored in memory units and executed by processors. A memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. Further, such wireless communication systems may additionally include peer-to-peer (e.g., user equipment-to-user equipment) ad hoc network systems often using unpaired unlicensed spectrums, 802.xx wireless LAN, BLUETOOTH, and/or any other short- or long-range, wireless communication techniques.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications, and variations that fall within scope of the appended claims. Additionally, all or a portion of any embodiment may be utilized with all or a portion of any other embodiments, unless stated otherwise.

What is claimed is:

1. A method performed by a device, the method comprising:
   determining, at the device, whether the device is allowed to attach to an operator network based at least partially on whether all access point names in a minimum access point name list accessible by the device are enabled in the device;
   allowing the device to attach to the operator network if it is determined that the device is allowed to attach to the operator network; and
   preventing the device from attaching to the operator network if it is determined that the device is not allowed to attach to the operator network.

2. The method of claim 1, further comprising:
   specifying an access point name that is enabled in the device to the operator network to cause the operator network to provide the device with access to a packet data network that corresponds to the access point name.

3. The method of claim 1,
   wherein the minimum access point name list includes a plurality of access point names.

4. The method of claim 1,
   said determining performed when the device powers up or when there is a software reset of the device.

5. The method of claim 1,
   wherein the device selects the minimum access point name list from among a plurality of possible minimum access point name lists based on a type of radio technology to be used by the device.

6. The method of claim 5,
   wherein the device selects a different minimum access point name list for use of Long Term Evolution (LTE) radio technology than is selected for evolved High Rate Packet Data (eHRPD) radio technology.

7. The method of claim 1,
   wherein an access point name is enabled in the device if a control parameter for the access point name that is stored in an application profile in the device is enabled.

8. The method of claim 1,
   wherein an access point name is enabled in the device if a control parameter for the access point name that is stored in an application profile in the device is enabled and another control parameter for the access point name that is stored in an extended file in a universal integrated circuit card inserted into the device is enabled.

9. The method of claim 1, further comprising:
   receiving a command through wireless communication that specifies one or more access point names to be disabled in the device; and
   disabling, in the device, the one or more access point names specified in the command.

10. The method of claim 9, further comprising:
    detaching the device from the operator network if any of the one or more access point names to be disabled is in a detach minimum access point name list in the device.

11. The method of claim 10, further comprising:
    preventing, if the device has been detached from the operator network due to the disabling of an access point name, the device from attempting to reattach to the operator network until an integrated circuit card in the device is removed and replaced.

12. The method of claim 1, further comprising:
    reattempting a connection to a packet data network without tearing down a Point-to-Point Protocol (PPP) context for the connection to the packet data network if the device is disconnected from the packet data network, wherein the packet data network is a last packet data network to which the device was connecting, and the access point name for the packet data network is on a particular access point name list.

13. A device, comprising:
    processing circuitry configured to determine, at the device, whether the device is allowed to attach to an operator network based at least partially on whether all access point names in a minimum access point name list accessible by the device are enabled in the device; and
    communication circuitry for wireless communication;

the processing circuitry further configured to allow the device to attach to the operator network using the communication circuitry if it is determined that the device is allowed to attach to the operator network, and configured to prevent the device from attaching to the operator network if it is determined that the device is not allowed to attach to the operator network.

14. The device of claim 13, the processing circuitry configured to select the minimum access point name list from among a plurality of possible minimum access point name lists based on a type of radio technology to be used by the device.

15. The device of claim 14, the processing circuitry configured to select a different minimum access point name list for use of Long Term Evolution (LTE) radio technology than is selected for evolved High Rate Packet Data (eHRPD) radio technology.

16. The device of claim 13, the communication circuitry configured to receive a command through wireless communication that specifies one or more access point names to be disabled in the device; and
the processing circuitry configured to disable, in the device, the one or more access point names specified in the command.

17. The device of claim 16, the processing circuitry configured to control the communication circuitry to detach the device from the operator network if any of the one or more access point names to be disabled is in a detach minimum access point name list in the device.

18. The device of claim 17, the processing circuitry configured to prevent, if the device has been detached from the operator network due to the disabling of an access point name, the device from attempting to reattach to the operator network until an integrated circuit card in the device is removed and replaced.

19. The device of claim 13, the processing circuitry configured to control the communication circuitry to reattempt a connection to a packet data network without tearing down a Point-to-Point Protocol (PPP) context for the connection to the packet data network if the device is disconnected from the packet data network, wherein the packet data network is a last packet data network to which the device was connecting, and the access point name for the packet data network is on a particular access point name list.

20. A non-transitory processor readable storage medium storing a program that when executed on a processor of a device causes the processor to perform a method, the method comprising:
determining, at the device, whether the device is allowed to attach to an operator network based at least partially on whether all access point names in a minimum access point name list accessible by the device are enabled in the device;
allowing the device to attach to the operator network if it is determined that the device is allowed to attach to the operator network; and
preventing the device from attaching to the operator network if it is determined that the device is not allowed to attach to the operator network.

* * * * *